United States Patent [19]
Ando

[11] Patent Number: 4,479,856
[45] Date of Patent: Oct. 30, 1984

[54] ZINC DENDRITE INHIBITOR

[75] Inventor: Yasuo Ando, Mitaka, Japan

[73] Assignee: Meidensha Electric Mfg. Co., Ltd., Tokyo, Japan

[21] Appl. No.: 521,373

[22] Filed: Aug. 8, 1983

[30] Foreign Application Priority Data

Aug. 9, 1982 [JP] Japan ................. 56-137358

[51] Int. Cl.³ ............................ C25D 3/22
[52] U.S. Cl. ..................... 204/55 R; 204/DIG. 2; 429/201
[58] Field of Search .............. 204/55 R, DIG. 2; 429/199, 201

[56] References Cited

U.S. PATENT DOCUMENTS

| | | | |
|---|---|---|---|
| 2,729,602 | 1/1956 | Van Houten | 204/55 R |
| 2,905,602 | 9/1959 | Kirstahler et al. | 204/55 R |
| 3,660,170 | 5/1972 | Rampel | 136/154 |
| 3,957,595 | 5/1976 | DuBrow et al. | 204/55 R |
| 4,306,003 | 12/1981 | Henriksen | 429/101 |

Primary Examiner—R. L. Andrews
Attorney, Agent, or Firm—Fleit, Jacobson, Cohn & Price

[57] ABSTRACT

A dendrite inhibitor includes a quaternary ammonium salt and at least two metal ions selected from the group consisting of lead, tin and cadmium ions, and the inhibitor is used by adding it to an electrolyte for subjecting zinc to electrolysis through an electrochemical reaction.

5 Claims, 2 Drawing Figures

ZINC DENDRITE INHIBITOR

BACKGROUND OF THE INVENTION

1. Field of the Invention

The present invention relates to a zinc dendrite inhibitor whereby in an electrolyte circulation-type secondary cell using zinc as an active material or in the case of electrochemical zinc plating, the zinc deposited and grown on an electrode surface is prevented from developing into dendritic crystals (hereinafter referred to as dendrites) and a smooth deposited zinc surface is produced.

2. Description of the Prior Art

The electrolyte circulation-type secondary cell is basically constructed as shown in FIG. 1 and it uses zinc halide-electrolytes. This cell comprises a unit cell 1 partitioned by a separating membrane (separator) 2 to form a positive electrode chamber 3 and a negative electrode chamber 4 on its sides, a positive electrode 5 positioned in the positive electrode chamber 3 and a negative electrode (zinc electrode) 6 positioned in the negative electrode chamber 4. A positive electrode electrolyte (e.g., $ZnBr_2 + Br_2$) is circulated through the positive electrode chamber 3 from a positive electrode electrolyte storage tank 7 by a pump 9 and a negative electrode electrolyte (e.g., $ZnBr_2$) is circulated through the negative electrode chamber 4 from a negative electrolyte storage tank 8 by a pump 13. Numerals 11 and 12 designate valves which are opened during the charging and discharging, respectively.

When the above-mentioned cell is charged, bromine is deposited on the positive electrode side indicated by $\oplus$ and zinc is deposited on the negative electrode side indicated by $\ominus$. While there is no problem if the deposited zinc forms uniformly and gradually increases its thickness on the negative electrode surface, generally the deposited zinc tends to develop into dendrites and grows locally due to various causes.

The process of formation of dendrites on the negative electrode surface is considered to approximately include the following steps. In other words, during the initial charging period metal zinc deposited on the negative electrode surface does not necessarily grow uniformly over the whole surface of the electrode but the metal zinc is deposited in a spotty manner. During this period, what can be considered as nuclei of dendrites are already produced. As a result, if the charging and discharging are continued in such a condition, the electrodeposition preferentially takes place at the spottily produced nuclei thus eventually producing dendrites.

When the dendrites grow on the negative electrode surface, the electric field concentrates so that the rate of growth of the dendrites increases and the chance of the zinc electrode surface contacting a fresh supply of the electrolyte decreases, thus not only deteriorating the cell efficiency but also causing the extremely fragile dendrites to fall off the electrode by a relatively small stress. As a result, the dendrites fallen off in this way cause clogging of the electrolyte circulation pipe and deterioration of the pump efficiency.

Assuming that such dendrites do not fall off the electrode but continue to grow so that the dendrites continue to grow progressively as shown at a, b and c in FIG. 2 or the growth progresses extremely, the dendrites directly contact with the positive electrode surface so that a electric short-circuit is formed and eventually the cell is damaged. Thus, the inhibition of growth of dendrites constitutes one of the very important requirements.

Such undesired phenomena occur even in the case of a electrochemical plating involving the electrolysis of zinc giving rise to a disadvantage of damaging the smoothness of a processed object.

In view of these requirements, various studies have been made on dendrite inhibitors and ionic or nonionic surface active agents, zinc electrochemical plating brighteners, etc., have for example been used. However, these agents are inadequate and leave much room for improvement with respect to such chemical resistances as resistance to bromine, the smoothness of deposited zinc with a large current density and large electrical quantity and so on. Also, these agents are not capable of maintaining stable performance during cyclic use over a long period of time and they are also inadequate in terms of the essential dendrite inhibitory effect.

SUMMARY OF THE INVENTION

It is an object of the present invention to provide an inhibitor capable of effectively inhibiting the deposition of dendrites.

In accordance with the invention there is thus provided a dendrite inhibitor including a quaternary ammonium salt and one or more metal ions selected from the group consisting of lead, tin and cadmium ions and used by mixing with an electrolyte for effecting the electrolysis of zinc by an electrochemical reaction.

DESCRIPTION OF THE PREFERRED EMBODIMENTS

Figure 1:
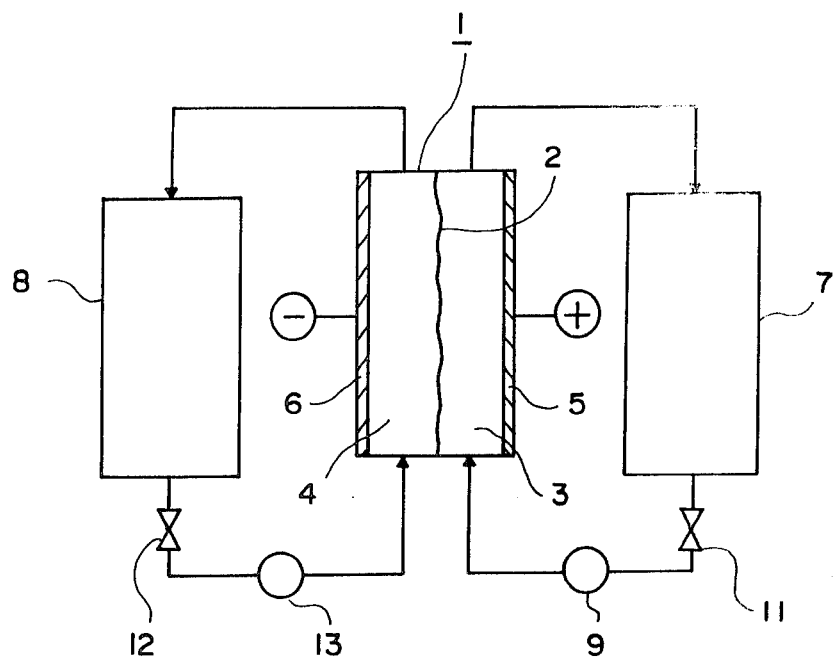
Figure 2:
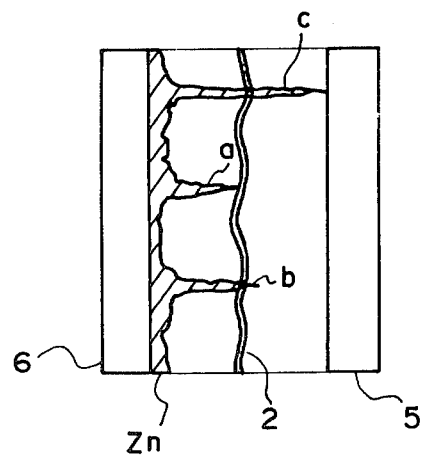

The quaternary ammonium salt used with the present invention may consist of a chemical compound having the general formula $[R_1R_2R_3R_4N]^+ X^-$ (where $R_1$, $R_2$, $R_3$ and $R_4$ are radicals such as alkyl, benzyl or phenyl radicals and X represents a halogen, $\frac{1}{2} SO_4$ or an intermolecular quaternary ammonium salt formed by one or more heterocyclic compounds selected from the group consisting of morpholine, piperidine and pyrolidine. More specifically, trimethyldodecylammonium, dimethylbenzyldodecylammonium, trimethylphenylammonium, methylethylmorpholinium, methylethylpiperidinium, methylethylpyrolidinium, etc., may for example be used.

On the other hand, lead, tin or cadmium ions are provided in the form of halides, sulfates, acetates, phosphates or the like and the resulting negative ions, have no effect on the electrochemical reaction.

The following Table 1 shows the results of tests conducted by adding varying amounts of lead, tin and cadmium ions to zinc electrolytes containing quaternary ammonium salts and examining the resulting dendrite inhibitory effects. The addition of the metal ions was effected by adding $SnCl_2$, $PbBr_2$ and $CdBr_2$.

Under the testing conditions of zinc bromide 3 mole/l pH 2.5 and charging current density 40 mA/cm$^2$, the conditions obtained after the charging for 8 hours were observed.

TABLE 1

| Added amounts, mole/l | | | Quaternary Ammonium | Evalua- | |
|---|---|---|---|---|---|
| Pb++ | Sn++ | Cd++ | Salt, mole/l | tion | Others |
| 0 | 0 | 0 | 0 | D | Large quantity of dendrites, electric shorting during charging |
| $5 \times 10^{-4}$ | 0 | 0 | 0 | C | Large quantity of small dendrites |
| 0 | $5 \times 10^{-4}$ | 0 | 0 | C | |
| 0 | 0 | $5 \times 10^{-4}$ | 0 | C | |
| 0 | 0 | 0 | Methylethylmorpholiniumbromide, 1 | C | |
| 0 | 0 | 0 | Methylethylmorpholiniumbromide, 1, dimethylbenzyldodecylammonium bromide, $1 \times 10^{-4}$ | B | Practically no dendrite, some surface irregularities, no luster |
| $5 \times 10^{-4}$ | 0 | 0 | Methylethylmorpholiniumbromide, 1 | C | |
| 0 | $5 \times 10^{-4}$ | 0 | " | C | |
| 0 | 0 | $5 \times 10^{-4}$ | " | C | |
| $5 \times 10^{-4}$ | $5 \times 10^{-4}$ | 0 | " | A | Smooth with no luster |
| $5 \times 10^{-4}$ | 0 | $5 \times 10^{-4}$ | " | B | |
| 0 | $5 \times 10^{-4}$ | $5 \times 14^{-4}$ | " | B | |
| 0 | 0 | 0 | Tetrabuytlammonium bromide, 0.01 | B | |
| 0 | 0 | 0 | Trimethyldodecylammonium, bromide 0.01 | B | |
| $10^{-4}$ | $10^{-4}$ | $10^{-4}$ | Methylethylmorpholiniumbromide, 1 | A | Smooth surface |
| $2 \times 10^{-4}$ | $2 \times 10^{-4}$ | $2 \times 10^{-4}$ | " | A | Smooth surface |
| $5 \times 10^{-4}$ | $5 \times 10^{-4}$ | $5 \times 10^{-4}$ | " | A | Smooth surface with metallic luster |
| $7.5 \times 10^{-4}$ | $7.5 \times 10^{-4}$ | $7.5 \times 10^{-4}$ | " | A | Smooth surface with metallic luster |
| $10^{-3}$ | $10^{-3}$ | $10^{-3}$ | " | A | Whitish electrolyte, smooth surface |
| $5 \times 10^{-4}$ | $5 \times 10^{-4}$ | $5 \times 10^{-4}$ | Tetrabutylammonium bromide, 0.01 | A | Metallic luster |
| " | " | " | Trimethyldodecylammonium bromide, 0.01 | A | " |
| " | " | " | Dimethylbenzyldodecylammonium bromide, $10^{-4}$ | A | " |
| " | " | " | 0 | B | |
| $10^{-3}$ | $10^{-3}$ | $10^{-3}$ | 0 | B | |

The evaluation A indicates a smooth surface without any dendrite, the evaluation B a surface having irregularities, the evaluation C a surface having a large quantity of small dendrites and the evaluation D a surface having a large quantity of dendrites.

These results have shown that by adding to an electrolyte a quaternary ammonium salt mixed with a suitable amount of lead, tin or cadmium ions, it is possible to inhibit the deposition of dendrites effectively and produce a deposited zinc surface which is smooth and has a metallic luster.

Further, the 6-hour charging and discharging cycle tests at 40 mA/cm² have shown at the tests of over 20 cycles with the addition of $5 \times 10^{-4}$ mole/l of lead, tin and cadmium ions, respectively, resulted in deposited zinc surfaces which were smooth and having a metallic luster.

With the addition of no lead, tin or cadmium, the first cycle showed the deposition of small dendrites and the third cycle showed the occurrence of electric short-circuiting between the positive electrode and the negative electrode due to the falling off of the dendrites from the electrode, etc. This result also shows that the addition of lead, tin or cadmium is especially effective in the case of secondary battery.

Then, using the electrolytes containing $5 \times 10^{-4}$ mole/l of lead, tine and cadmium ions, respectively, and 1 mole/l of methylethylmorpholiniumbromide and varying the current density, the resulting dendrite inhibitory effects were examined and the following results were obtained. The charging electric quantity used was 240 mA.H/cm².

TABLE 2

| Current density (mA/cm²) | Evaluation |
|---|---|
| 20 | A |
| 40 | A |
| 60 | A |
| 80 | A |
| 100 | B |

From these test results it has been confirmed that satisfactory inhibition of dendrites is ensured even at high current densities.

Then, in addition to the examinations shown in Table 1, the extensive examinations were made on the concentration of the quaternary ammonium salts and the metal ions added and used with the former and it has been confirmed that the desired effects due to their use could be displayed if the quaternary ammonium salt concentration is in the range from over $10^{-4}$ mol/l to the saturated concentration, the additional lead ion concentration is in the range from $1 \times 10^{-4}$ to the saturated concentration, preferably $5 \times 10^{-4}$ mole/l, the additional tin ion concentration is substantially in the same range as the former and the cadmium ion concentration is in the range from 0 to $10^{-2}$ mole/l, preferably in the range from $1 \times 10^{-4}$ to $1 \times 10^{-3}$ mole/l.

From the foregoing description it will be seen that the use of an inhibitor according to the invention has the effect of effectively suppressing the deposition of dendrites even at high current densities and producing a deposited zinc surface which is smooth and having a metallic luster. Further, this inhibitor contains metal ions and a quaternary ammonium salt and therefore it has no danger of decomposition, etc.

What is claimed is:

1. A zinc dendrite inhibitor for addition to a zinc halide-containing electrolyte which deposits zinc on a negative electrode through an electrochemical reaction, said inhibitor comprising: a quaternary ammonium salt and at least two metal ions selected from the group consisting of from about $10^{-4}$ to about $10^{-3}$ mole/l of divalent lead ions, from about $10^{-4}$ to about $10^{-3}$ mole/l of divalent tin ions, and less than about $10^{-2}$ mole/l of divalent cadmium ions.

2. An inhibitor according to claim 1, wherein said quaternary ammonium salt comprises a chemical compound having the general formula $R_1R_2R_3R_4N^+ \ X^-$, where $R_1$, $R_2$, $R_3$ and $R_4$ are radicals selected from the group consisting of alkyl and benzyl radicals, wherein at least 2 of $R_1$, $R_2$, $R_3$ and $R_4$ are alkyl radicals each having a carbon number of at most 12, and where X is a radical selected from the group consisting of halogen, $\frac{1}{2}$ $SO_4$, and morpholine.

3. An inhibitor according to claim 1, wherein said metal ions are presented by donors selected from the group consisting of halides, sulfates, acetates and phosphates.

4. An inhibitor according to claim 1, wherein said quaternary ammonium salt has a concentration ranging from $10^{-4}$ mole/l to the saturated concentration thereof.

5. An inhibitor according to claim 1, wherein the concentration of said lead ions and said tin ions is each $5 \times 10^{-4}$ mole/l and wherein the concentration of said cadmium ions is in the range of from about $10^{-4}$ to about $10^{-3}$ mole/l.

* * * * *